United States Patent
Cho et al.

(10) Patent No.: US 11,557,907 B2
(45) Date of Patent: Jan. 17, 2023

(54) METHOD, ELECTRONIC DEVICE, AND STORAGE MEDIUM FOR DISPLAYING CHARGING STATE IN START OF CHARGING

(71) Applicant: SAMSUNG ELECTRONICS CO., LTD., Suwon-si (KR)

(72) Inventors: Jinhoon Cho, Suwon-si (KR); Minho Yang, Suwon-si (KR); Misook Yu, Suwon-si (KR); Joah Choi, Suwon-si (KR); Kyoungtaek Kim, Suwon-si (KR); Huichul Yang, Suwon-si (KR); Minyoung Chang, Suwon-si (KR); Jungwoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/022,648

(22) Filed: Sep. 16, 2020

(65) Prior Publication Data

US 2021/0083498 A1    Mar. 18, 2021

(30) Foreign Application Priority Data

Sep. 16, 2019    (KR) .......................... 10-2019-0113682

(51) Int. Cl.
*H02J 7/00*      (2006.01)
*G06T 11/60*      (2006.01)
(Continued)

(52) U.S. Cl.
CPC .......... *H02J 7/0048* (2020.01); *G06T 11/001* (2013.01); *G06T 11/60* (2013.01);
(Continued)

(58) Field of Classification Search
CPC .......... H02J 7/0048; H02J 7/342; H02J 50/80; H02J 7/0044; H02J 50/10; H02J 7/0047;
(Continued)

(56) References Cited

U.S. PATENT DOCUMENTS

| 2008/0084189 A1 | 4/2008 | Kim |
| 2008/0104537 A1* | 5/2008 | Scott .................. G06F 3/04812 715/800 |

(Continued)

FOREIGN PATENT DOCUMENTS

| KR | 10-2008-0011940 | 2/2008 |
| KR | 10-2008-0032764 | 4/2008 |

(Continued)

OTHER PUBLICATIONS

International Search Report and Written Opinion dated Dec. 22, 2020 in corresponding Application No. PCT/KR2020/012468.

(Continued)

*Primary Examiner* — YuJang Tswei
(74) *Attorney, Agent, or Firm* — Nixon & Vanderhye P.C.

(57) ABSTRACT

Provided is an electronic device including: a battery, a display, at least one processor, and a memory, the memory storing instructions that, when executed, cause the at least one processor to: identify a charging scheme for the battery and a state of the display upon detection of a charging start event, display a graphic object on the display using a first display scheme indicating a first charging scheme based on the state of the display based on the charging scheme being the first charging scheme, and display the graphic object on the display using a second display scheme indicating a second charging scheme based on the state of the display based on the charging scheme being a second charging scheme.

10 Claims, 12 Drawing Sheets

(51) Int. Cl.
*G06T 11/00* (2006.01)
*H02J 7/34* (2006.01)
*G06T 11/20* (2006.01)
*H02J 50/80* (2016.01)
*H02J 50/00* (2016.01)
*H02J 50/10* (2016.01)
*H04M 1/724* (2021.01)

(52) U.S. Cl.
CPC ......... *G06T 11/206* (2013.01); *G06T 2210/62* (2013.01); *H02J 7/0044* (2013.01); *H02J 7/0047* (2013.01); *H02J 7/342* (2020.01); *H02J 50/005* (2020.01); *H02J 50/10* (2016.02); *H02J 50/80* (2016.02); *H04M 1/724* (2021.01); *H04M 2201/34* (2013.01); *H04M 2201/36* (2013.01); *H04M 2201/38* (2013.01)

(58) Field of Classification Search
CPC ...... H02J 50/005; G06T 11/60; G06T 11/001; G06T 2210/62; G06T 11/206; H04M 1/724; H04M 2201/34; H04M 2201/36; H04M 2201/38
See application file for complete search history.

(56) References Cited

U.S. PATENT DOCUMENTS

| | | | | |
|---|---|---|---|---|
| 2010/0306705 | A1* | 12/2010 | Nilsson | H04M 1/67 345/173 |
| 2011/0009172 | A1* | 1/2011 | Song | H04M 1/72427 455/566 |
| 2011/0119610 | A1* | 5/2011 | Hackborn | G06F 3/0488 715/764 |
| 2012/0013552 | A1* | 1/2012 | Ahn | G06F 3/04886 345/173 |
| 2013/0076715 | A1* | 3/2013 | Selim | G06F 3/0485 345/211 |
| 2013/0132854 | A1* | 5/2013 | Raleigh | G06F 3/0482 715/738 |
| 2013/0135235 | A1 | 5/2013 | Noutami | |
| 2013/0264998 | A1* | 10/2013 | Schul | H02J 7/0048 320/107 |
| 2015/0123599 | A1 | 5/2015 | Yun et al. | |
| 2016/0013678 | A1* | 1/2016 | Bell | H02J 50/40 320/108 |
| 2016/0064959 | A1* | 3/2016 | Jung | G06F 1/305 320/162 |
| 2017/0094048 | A1* | 3/2017 | Kim | H04M 1/22 |
| 2018/0123379 | A1* | 5/2018 | Ha | H02J 50/90 |
| 2018/0240260 | A1 | 8/2018 | Lee et al. | |
| 2018/0242242 | A1 | 8/2018 | Lee et al. | |
| 2018/0351373 | A1* | 12/2018 | Behzadi | G06F 1/26 |
| 2019/0182374 | A1* | 6/2019 | Park | H04M 1/72415 |
| 2019/0280504 | A1* | 9/2019 | Lee | H04M 1/725 |
| 2020/0383235 | A1 | 12/2020 | Yu et al. | |
| 2021/0109623 | A1 | 4/2021 | Bae et al. | |

FOREIGN PATENT DOCUMENTS

| | | |
|---|---|---|
| KR | 10-2018-0047800 | 5/2018 |
| WO | WO 2018/174426 A1 | 9/2018 |
| WO | WO 2018/182287 A1 | 10/2018 |
| WO | 2018/226259 | 12/2018 |

OTHER PUBLICATIONS

Extended European Search Report dated Aug. 28, 2022 for EP Application No. 20865699.1.

* cited by examiner

METHOD, ELECTRONIC DEVICE, AND STORAGE MEDIUM FOR DISPLAYING CHARGING STATE IN START OF CHARGING

CROSS-REFERENCE TO RELATED APPLICATION

This application is based on and claims priority under 35 U.S.C. § 119 to Korean Patent Application No. 10-2019-0113682 filed on Sep. 16, 2019 in the Korean Intellectual Property Office, the entire disclosure of which is incorporated herein by reference.

BACKGROUND

Field

The disclosure relates to a method, electronic device, and storage medium for displaying a charging state in start of charging.

Description of Related Art

Recently, the use of electronic devices that are easy to carry, such as smartphones, tablet personal computers (PCs), wearable devices, etc., has increased, and with the sharply increasing use of the electronic devices, research on high-performance batteries for lengthening a use time of the electronic devices has also been actively conducted. These electronic devices may be connected with various external electronic devices, and may receive power from or transmit power to an external electronic device.

Along with a consuming trend emphasizing design, in development of an electronic device, the design of a graphic object such as a visual element like a background, an icon, a widget, etc., displayed on a display has been considered important, together with the exterior design of the electronic device. Recently, in development of the electronic device considering the design of the graphic object, a technique for implementing the graphic object of the display of the electronic device naturally based on a user's sense has been developed.

Thus, the electronic device may provide various user interfaces for providing various functions to the user. As the user interfaces are diversified, it may be important to provide an aesthetic effect as well as convenience in interaction with the electronic device to the user.

At present, the electronic device is visually providing an alarm corresponding to charging to the user using an indicator region of the electronic device or a screen-on scheme in wired or wireless charging.

However, as high-speed charging is applied, the electronic device may provide rapid battery charging in wired or wireless charging. On the other hand, the electronic device is merely capable of providing a consistent experience, regardless of a current work state as well as a charging speed in charging. Therefore, there is a need for providing an interactive visual effect to avoid disturbing a user's work, while sufficiently guaranteeing an alarm regarding a charging state in start of charging, based on various states of the electronic device such as a screen-off state, an application execution state, etc.

The above information is presented as background information only to assist with an understanding of the present disclosure. No determination has been made, and no assertion is made, as to whether any of the above might be applicable as prior art with regard to the present disclosure.

SUMMARY

According to various example embodiments of the present disclosure, an electronic device includes: a battery, a display, at least one processor, and a memory, the memory storing instructions which, when executed, cause the at least one processor to: based on a charging start event being detected, identify whether a charging scheme for the battery is a first charging scheme or a second charging scheme and identify a state of the display, display a graphic object on the display using a first display scheme indicating the first charging scheme based on the state of the display in response to the charging scheme being the first charging scheme, and display the graphic object on the display using a second display scheme indicating the second charging scheme based on the state of the display in response to the charging scheme being the second charging scheme.

According to various example embodiments of the present disclosure, a method for displaying a charging state in start of charging in an electronic device includes: identifying whether a charging start event is detected based on the charging start event being detected, identifying whether a charging scheme of a battery for the electronic device is a first charging scheme or a second charging scheme and identifying a state of a display, in response to the charging scheme being the first charging scheme, displaying a graphic object on the display using a first display scheme indicating the first charging scheme based on the state of the display, and in response to the charging scheme being the second charging scheme, displaying the graphic object on the display using a second display scheme indicating a second charging scheme based on the state of the display.

According to various example embodiments of the present disclosure, a non-transitory computer readable storage medium has stored thereon instructions, which, when executed by at least one processor, cause an electronic device to perform at least one operation including: identifying whether a charging start event is detected, based on the charging start event being detected, identifying whether a charging scheme of a battery for the electronic device is a first charging scheme or a second charging scheme and identifying a state of a display, in response to the charging scheme being the first charging scheme, displaying a graphic object on the display using a first display scheme indicating a first charging scheme based on the state of the display, and in response to the charging scheme being second first charging scheme, displaying the graphic object on the display using a second display scheme indicating a second charging scheme based on the state of the display.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Hereinafter, various example embodiments of the present disclosure will be disclosed with reference to the accompanying drawings.

The terms as used herein are provided merely to describe various example embodiments thereof, but not to limit the scope of other embodiments of the disclosure. It is to be understood that the singular forms "a", "an" and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Figure 1:
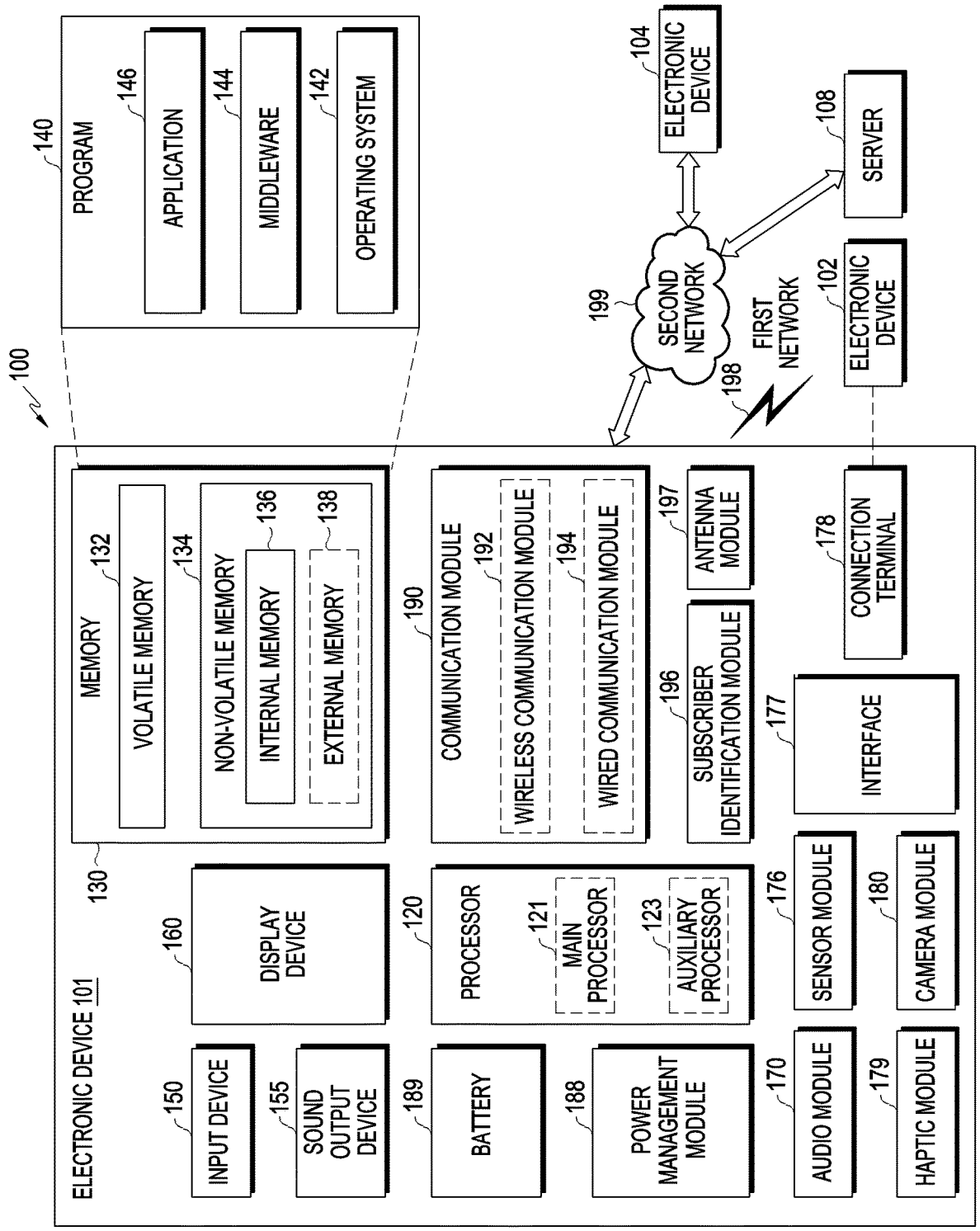
FIG. 1 is a block diagram illustrating an example electronic device in a network environment, according to various embodiments of the present disclosure.

FIG. 1 is a block diagram illustrating an example electronic device 101 in a network environment 100 according to various embodiments of the present disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of these components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the present disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the present disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the present disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the present disclosure, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the present disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the present disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the present disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the present disclosure, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment of the present disclosure, the power management module 188 may be implemented as at least part of, for example, a power management integrated circuit (PMIC).

The battery 189 may supply power to at least one component of the electronic device 101. According to an embodiment of the present disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the present disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment of the present disclosure, the antenna module 197 may include an antenna including a radiating element including a conductive material or a conductive pattern formed in or on a substrate (e.g., a printed circuit board (PCB)). According to an embodiment of the present disclosure, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the present disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, a general-purpose input and output (GPIO), a serial peripheral interface (SPI), or a mobile industry processor interface (MIPI)).

According to an embodiment of the present disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the present disclosure, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various example embodiments of the present disclosure, an electronic device may include: a battery, a display, at least one processor, and a memory, the memory storing instructions which, when executed, cause the at least one processor to: based on a charging start event being detected, identify whether a charging scheme for the battery is a first charging scheme or a second charging scheme and identify a state of the display; in response to the charging scheme being the first charging scheme, display a graphic object on the display using a first display scheme indicating the first charging scheme based on the state of the display; and in response to the charging scheme being the second charging scheme, display the graphic object on the display using a second display scheme indicating the second charging scheme based on the state of the display.

According to various example embodiments of the present disclosure, the first display scheme may be a scheme in which at least one of a first movement speed related to the first charging scheme, a color of the graphic object, or a color effect of the graphic object changes, and the second display scheme may be a scheme in which at least one of a second movement speed related to the second charging scheme, the color of the graphic object, or the color effect of the graphic object changes.

According to various example embodiments of the present disclosure, the first charging scheme may support a first charging speed and the second charging scheme may support a second charging speed, wherein the first charging speed may be faster than the second charging speed.

According to various example embodiments of the present disclosure, the instructions, when executed, may cause the at least one processor to activate a partial region of the display and display the graphic object on the activated partial region based on the state of the display being an always-on-display (AOD) state.

According to various example embodiments of the present disclosure, the instructions, when executed, may cause the at least one processor to display the graphic object on a currently displayed screen, based on the state of the display being a screen-on state.

According to various example embodiments of the present disclosure, the instructions, when executed, may cause the processor to turn on the entire display and display the graphic object on the currently displayed screen, based on the state of the display being a screen-off state.

According to various example embodiments of the present disclosure, the instructions, when executed, may cause the processor to display the graphic object overlapping a locked screen, based on the currently displayed screen being the locked screen.

According to various example embodiments of the present disclosure, the instructions, when executed, may cause the processor to display the graphic object overlapping an application execution screen and display a part of the application execution screen other than the graphic object transparently, based on the currently displayed screen being the application execution screen.

According to various example embodiments of the present disclosure, the instructions, when executed, may cause the at least one processor to notify a charging state by continuously displaying of a plurality of images, based on the state of the display being a power-off state.

According to various example embodiments of the present disclosure, the instructions, when executed, may cause the at least one processor to notify a charging state using a display scheme in which at least one of a color of or flickering of an edge light of the electronic device changes.

According to various example embodiments of the present disclosure, the instructions, when executed, may cause the at least one processor to remove the displayed graphic object after an elapse of a preset time.

According to various example embodiments of the present disclosure, the instructions, when executed, may cause the at least one processor to control a color, a brightness, or a transparency of the graphic object to be changed based on a setting.

Hereinafter, referring to the accompanying drawings, a battery charging state will be described, and an electronic device having mounted thereon a battery and a charging device (or charger) that may be used to charge the electronic device will be described with reference to FIGS. 2, 3 and 4. According to an embodiment of the present disclosure, a charger may largely use a wireless charging scheme, a scheme including an external electronic device capable of supplying power to the electronic device, and a wired charging scheme.

Figure 2:
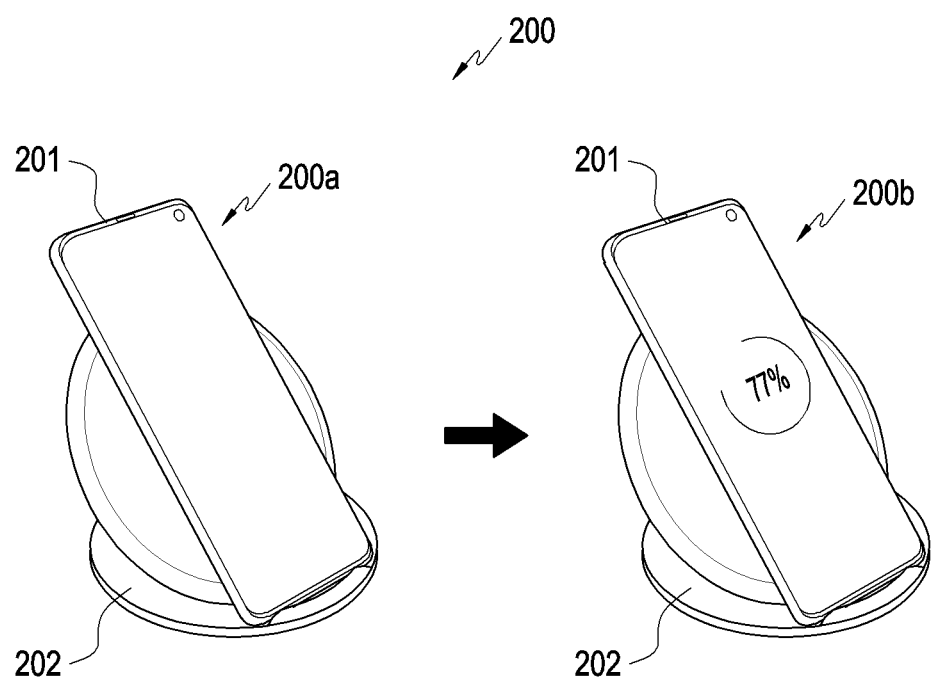
FIG. 2 is a diagram illustrating an example state where an electronic device is placed on a charging pad for wireless charging, according to various embodiments of the present disclosure.

FIG. 2 is a diagram 200 illustrating an example state where an electronic device is placed on a charging pad for wireless charging, according to various embodiments of the present disclosure.

In FIG. 2, the charger uses the wireless charging scheme, and as shown in FIG. 2, when an electronic device 201 is placed on a charging pad 202, a screen notifying a charging state in start of charging may be displayed on the screen of the electronic device 201. The electronic device 201 may be cradled in the form of standing or being placed on the charging pad.

For example, in a case 200a where the electronic device 201 is placed on the charging pad 202, the electronic device 201 may transfer a signal for requesting wireless charging to the charging pad 202. As the electronic device 201 receives a response to the signal from the charging pad 202, the electronic device 201 and the charging pad 202 may be connected as indicated by 200b, and wireless charging for the electronic device 201 may be initiated. In this case, in start of wireless charging, a charging scheme between the electronic device and the charging pad may be determined, and accordingly, any one of normal charging, fast charging, or super-fast charging may be determined.

According to an embodiment of the present disclosure, a graphic object dynamically changing in association with a charging state in start of charging may be displayed on the screen of the electronic device 201. For example, a charging state including the determined charging scheme, an expected charging completion time, and a charging capacity may be displayed together with a graphic object.

Figure 3:
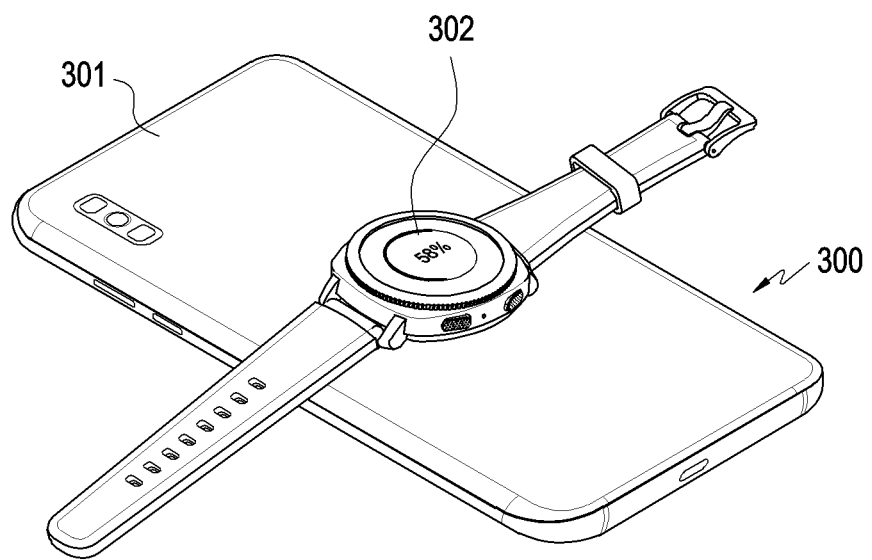
FIG. 3 is a diagram illustrating an example state where an external electronic device is placed on an electronic device for wireless charging, according to various embodiments of the present disclosure.

FIG. 3 is a diagram 300 illustrating an example state where an external electronic device is placed on an electronic device for wireless charging, according to various embodiments of the present disclosure.

FIG. 3 illustrates a scheme in which an electronic device 301 supplies power to an external electronic device 302. As shown in FIG. 3, the electronic device 301 may serve as a charging pad, and when the electronic device 301 is placed on the external electronic device 302, the external electronic device 302 may perform charging using the wireless charging scheme with the electronic device 301. The electronic device 301 may be a smartphone including a battery, and may include various electronic devices such as a laptop computer.

The external electronic device 302 may charge a battery of the external electronic device 302 at a first speed (or a normal speed or with a charging power of a first magnitude during a designated time) or at a second speed (or a high speed or with a charging power of a second magnitude during a designated time). The external electronic device 302 may supply required charging power according to a charging scheme (e.g., the normal charging scheme or the fast charging scheme) supportable in the external electronic device 302 by performing communication with the electronic device 301. For example, when the electronic device 301 is wirelessly connected to the external electronic device 302, power stored in the battery of the electronic device 301 may be supplied to the external electronic device 302.

The external electronic device 302 may have a smaller screen size than the electronic device 301, but may output a charging state through a user interface corresponding to the screen size of the external electronic device 302. For example, a graphic object dynamically changing with the charging scheme may be displayed on a circular display region of the external electronic device 302.

For example, for the fast charging scheme, a color, a brightness, and a color effect (e.g., a gradation effect or a flickering effect) of at least a portion of a graphic object related to charging may be displayed to change fast, in comparison to the normal charging scheme. Moreover, an animation effect of moving along the edge region of the circular display may be implemented. For example, an external electronic device such as a smart watch may have various shapes such as a circular shape, a rectangular shape, etc., and display a graphic object dynamically changing corresponding to a charging scheme on a display corresponding to various shapes, thereby allowing the user to feel a sense of speed for charging and to easily recognize various charging states.

Figure 4:
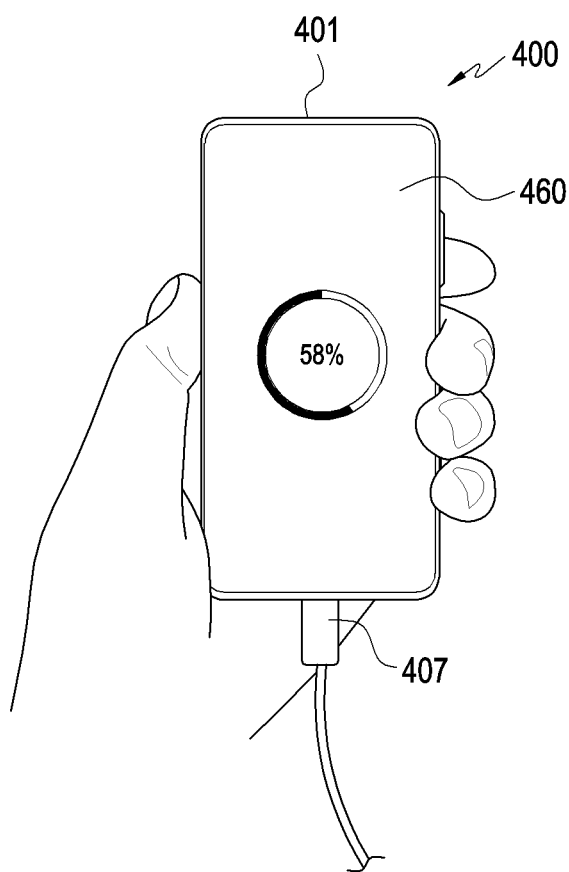
FIG. 4 is a diagram illustrating an example electronic device in charging with a connector, according to various embodiments of the disclosure.

FIG. 4 is a diagram 400 illustrating an example of an electronic device in charging with a connector, according to various embodiments of the disclosure. In FIG. 4, the charger uses the wired charging scheme. As shown in FIG. 4, for the wired charging scheme using a connector 407, charging may be initiated when the connector 407 is inserted, and the charging state may be displayed on a screen 407 of the electronic device 401 in insertion of the connector 407.

The connector 407 of the charger may include at least one of various forms such as a form in which the connector 407 includes a cable with a side electrically connectable with the electronic device 401 and the other side is provided as a code connectable with power, a form in which a cable is connected to an external electronic device capable of supplying power to supply power to the electronic device 401, etc. For example, a first-type charger (e.g., a travel adaptor (TA)) may be connected to the electronic device 401. According to an embodiment of the present disclosure, the first-type charger may include a charger capable of supporting super-fast charging for supplying a charging power of up to 45 W, and may supply high charging power when compared to other chargers including the wireless charging scheme.

According to an embodiment of the present disclosure, the electronic device 401 may output a charging screen corresponding to the charging scheme when the electronic device 401 is capable of supporting the charging scheme of the first-type charger. For example, the electronic device 401 may output a charging screen including information about a state of the battery. The electronic device 401 may output a screen 460 including indication information such as a charging state (e.g., a charging quantity), a type of the charger, connection or disconnection of the charger in association with battery charging, battery charging, etc.

According to various embodiments of the present disclosure, a graphic object related to charging may be output using different display schemes according to the charging scheme such as the normal charging scheme, the fast charging scheme, or the super-fast charging scheme. For example, in start of charging, a dynamic change of the graphic object may be output on the screen differently according to the charging scheme such as the normal charging scheme, the fast charging scheme, or the super-fast charging scheme. In this case, the user may feel a sense of speed according to the charging scheme, and thus may easily recognize the charging scheme.

Figure 5:
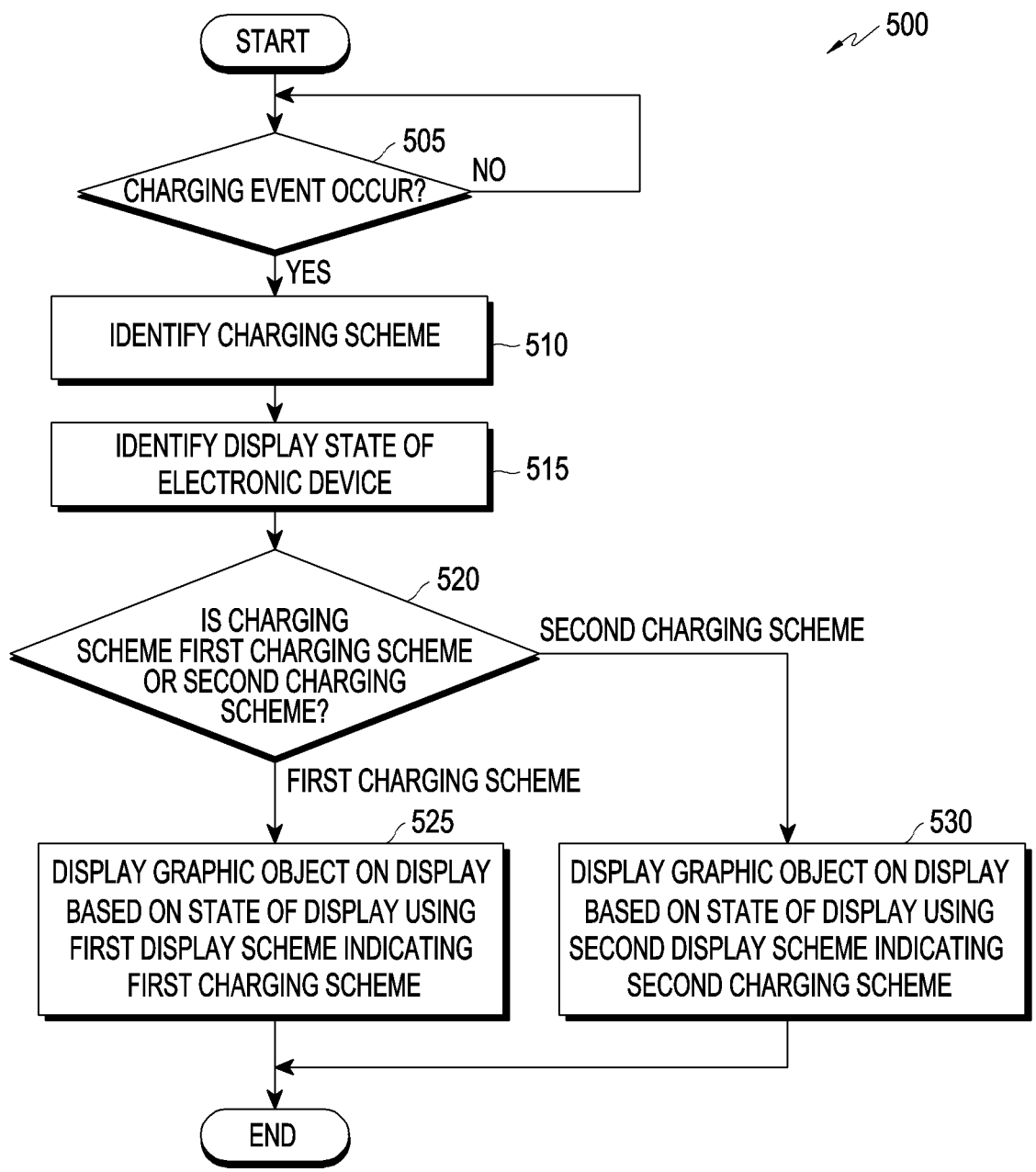
FIG. 5 is a flowchart illustrating example operation of an electronic device to display a charging state in start of charging, according to various embodiments of the disclosure.

FIG. 5 is a flowchart 500 illustrating example operation of an electronic device to display a charging state in start of charging, according to various embodiments of the disclosure.

Referring to FIG. 5, the method may include operations 505 through 530. Steps/operations in the operation method may be performed by at least one of the electronic device (e.g., the electronic device 101 of FIG. 1) or at least one processor (e.g., the processor 120 of FIG. 1) of the electronic device. In an embodiment of the present disclosure, at least one of operations 505 through 530 may be omitted, an order of some of them may be changed, or other operations may be added.

In operation 505, the electronic device 101 may identify whether a charging event indicating start of charging occurs. When occurrence of the charging event is detected (505—yes), the electronic device 101 may identify a supportable charging scheme in operation 510. According to an embodiment of the present disclosure, the electronic device 101 may identify start of charging by communicating with a connected charger or detecting a designated event signal from the charger, and may identify charging-related information such as a type of charging such as wired charging or wireless charging, a charging scheme, etc. Thus, the electronic device 101 may start control related to battery charging. According to various embodiments of the present disclosure, the electronic device 101 may output a control signal to display a graphic object related to charging differently according to at least one of a charging scheme of the connected charger (e.g., a magnitude and a speed of charging power supplied by the charger), a battery charging state (e.g., a charging quantity) at the time of start of charging, or the like.

In response to occurrence of the charging event, the electronic device 101 may identify a state of the display 160 thereof in operation 515. According to various embodiments of the present disclosure, the state of the display 160 may include at least one of an AOD state, a screen-on state, an application execution state, or a power-off state. For example, the state of the display 160 may roughly include a wake-up state where the user may use a function of the electronic device 101 and a sleep state where the use by the user is awaited, and the wake-up state may include the screen-off state and the application execution screen.

The sleep state may include the screen-off state where the screen is turned off in a case of absence of a user input during a certain time, and the AOD state. In the sleep state, the electronic device 101 may deactivate various hardware modules and/or software modules included in the electronic device 101 or may be driven with minimum power to execute a designated function. For example, upon switchover to the sleep state, the display of the electronic device is turned off, through which information processing or computation based on a hardware module and/or a software module is suppressed, thereby improving the battery use time of the electronic device 101.

In operation 520, the electronic device 101 may identify whether the charging scheme is the first charging scheme or the second charging scheme. According to various embodiments of the present disclosure, the first charging scheme may support a first charging speed and the second charging scheme may support a second charging speed, in which the first charging speed may be higher than the second charging speed. While the first charging scheme supporting the first charging speed and the second charging scheme supporting the second charging speed have been described above as an example, the electronic device 101 may also identify whether the charging scheme is a third charging scheme supporting a third charging speed for a plurality of charging schemes supportable by the electronic device 101. Herein, the third charging speed may be lower than the second charging speed. For example, the first charging scheme may be referred to as the super-fast charging scheme, the second charging scheme may be referred to as the fast charging scheme, and the third charging scheme may be referred to as the normal charging scheme. For the electronic device 101 supporting the first charging scheme and the second charging scheme, the first charging scheme may be referred to as the fast charging scheme and the second charging scheme may be referred to as the normal charging scheme.

When the charging scheme is the first charging scheme, the electronic device 101 may display a graphic object using a first display scheme indicating the first charging scheme based on the state of the display 160, in operation 525.

On the other hand, when the charging scheme is the second charging scheme, the electronic device 101 may display the graphic object using a second display scheme indicating the second charging scheme based on the state of the display 160.

According to various embodiments of the present disclosure, the first display scheme may be a scheme in which at least one of a first movement speed related to the first charging scheme, a color of the graphic object, or a color effect of the graphic object changes, and the second display scheme may be a scheme in which at least one of a second movement speed related to the second charging scheme, the color of the graphic object, or the color effect of the graphic object changes.

For example, for the first charging scheme, a graphic object related to charging may be output to move at a first movement speed higher than a second movement speed of a graphic object related to charging for the second charging scheme, or may be output to show such an effect. The graphic object may have a higher brightness value than the periphery thereof and may have various shapes such as a circular shape, a rectangular shape, a triangular shape, and an arrow. A gradation effect may be added to the periphery of the graphic object. In this case, according to the first display scheme and the second display scheme, the graphic object may be displayed in a scheme in which different movement speeds are applied or a color effect such as a color, gradation, etc., changes.

According to an embodiment of the present disclosure, a color, a brightness, or a transparency of the graphic object may be changed by user's setting. For example, when the currently displayed screen is the application execution screen, a setting value such as a color, a brightness, or a transparency for a graphic object related to charging may be changed at a user-desired level for an effective notification of the graphic object, without disturbing a user's work. According to an embodiment of the present disclosure, change of setting of the graphic object may be preset, and alternatively, when the graphic object is displayed in start of charging, setting values may be changed corresponding to a direction in which the user touches and drags the graphic object.

Meanwhile, the electronic device 101 may differently output the graphic object based on the state of the display as well as the charging scheme.

According to an embodiment of the present disclosure, when the state of the display is any one of the screen-on state or the application execution state, the graphic object may be displayed overlappingly on the currently displayed screen. For example, based on various states of an electronic device such as a screen-off state or an application execution state, a notification regarding a charging state may be transparently displayed, overlappingly on a currently displayed screen, without covering the currently displayed screen.

According to an embodiment of the present disclosure, when the state of the display is the AOD state, the partial region of the display may be activated and the graphic object may be displayed on the activated partial region. As such, in the sleep state such as the AOD state or the screen-off state, the partial region of the display 160 may be activated and the graphic object regarding the charging state may be differently provided on the activated region using the charging scheme, thereby effectively providing the charging state with low power in the low-power state.

Figure 6:
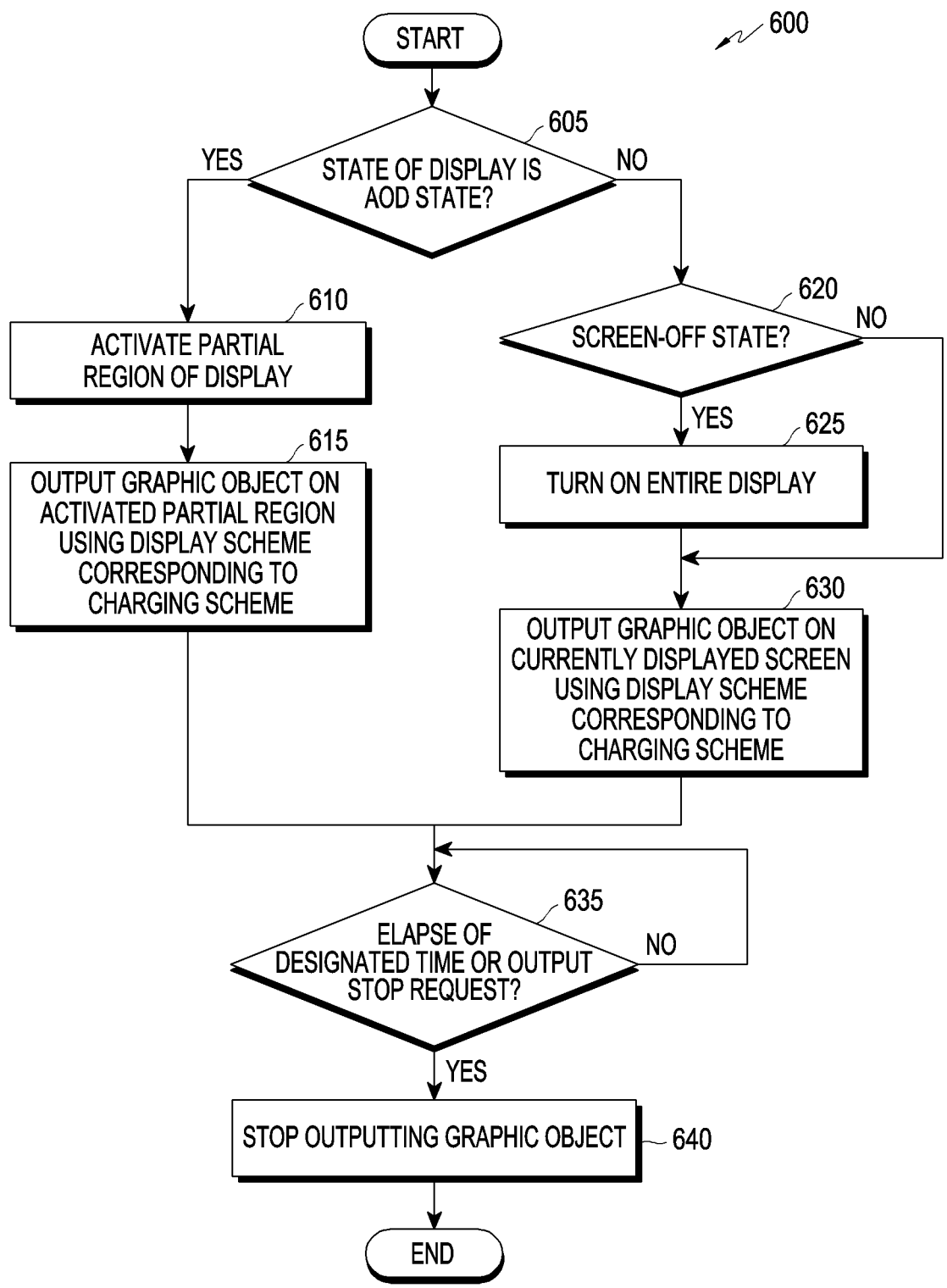
FIG. 6 is a flowchart illustrating example operation of an electronic device to display a charging state in start of charging, according to various embodiments of the disclosure.

FIG. 6 is a flowchart 600 illustrating example operation of an electronic device to display a charging state in start of charging, according to various embodiments of the disclosure.

Referring to FIG. 6, an operation method may include operations 605 through 640. Steps/operations in the operation method may be performed by at least one of the electronic device (e.g., the electronic device 101 of FIG. 1) or at least one processor (e.g., the processor 120 of FIG. 1) of the electronic device. In an embodiment of the present disclosure, at least one of operations 605 through 640 may be omitted, an order of some of them may be changed, or other operations may be added.

FIG. 6 is a flowchart illustrating a case where a graphic object related to charging is displayed based on a current display state of the electronic device 101 according to a display scheme indicating a charging scheme.

Referring to FIG. 6, the electronic device 101 may identify whether a state of the display 160 thereof is the AOD state, in operation 605. When the display 160 is in the AOD state (605—Yes), the electronic device 101 may activate a partial region of the display 160 in operation 610 and output the graphic object on the activated region according to the display scheme indicating the charging scheme in operation 615.

Meanwhile, when the display 160 is not in the AOD state (605—No), the electronic device 101 may identify whether the display 160 is in the screen-off state in operation 620. When the display 160 is in the screen-off state (620—Yes), the electronic device 101 may turn on the entire display 160 in operation 625 and output the graphic object on the currently displayed screen according to the display scheme indicating the charging scheme in operation 630. On the other hand, when the display 160 is not in the screen-off state, e.g., in the screen-on state, in operation 620 (620—Yes), which means that the screen is already turned on, the display 160 may output the graphic object on the currently displayed screen according to the display scheme corresponding to the charging scheme in operation 630.

When the display 160 displays the graphic object on the activated partial region or output the graphic object on the currently displayed screen according to the AOD state, the electronic device 101 may identify whether a designated time has elapsed or an output stop request is received from the user, in operation 635. When the designated time has elapsed or the output stop request is received (635—Yes), the electronic device 101 may stop outputting the graphic object in operation 640.

According to an embodiment of the present disclosure, the electronic device may set a time to display the graphic object in start of charging to a time defined at the time of release of a product, but a duration of display of the graphic object may be set to a user-set time. For example, in a scheme in which a graphic object is displayed for three seconds in start of charging and then disappears, the display of the graphic object may be set to be maintained during a user-set time. According to an embodiment of the present disclosure, the display of the graphic object may be set to be maintained during charging in the power-off state. According to an embodiment of the present disclosure, when an input to remove the display of the graphic object is received before the elapse of a preset time or a user-set time during the display of the graphic object in start of charging, the display of the graphic object may be removed.

Figure 7:
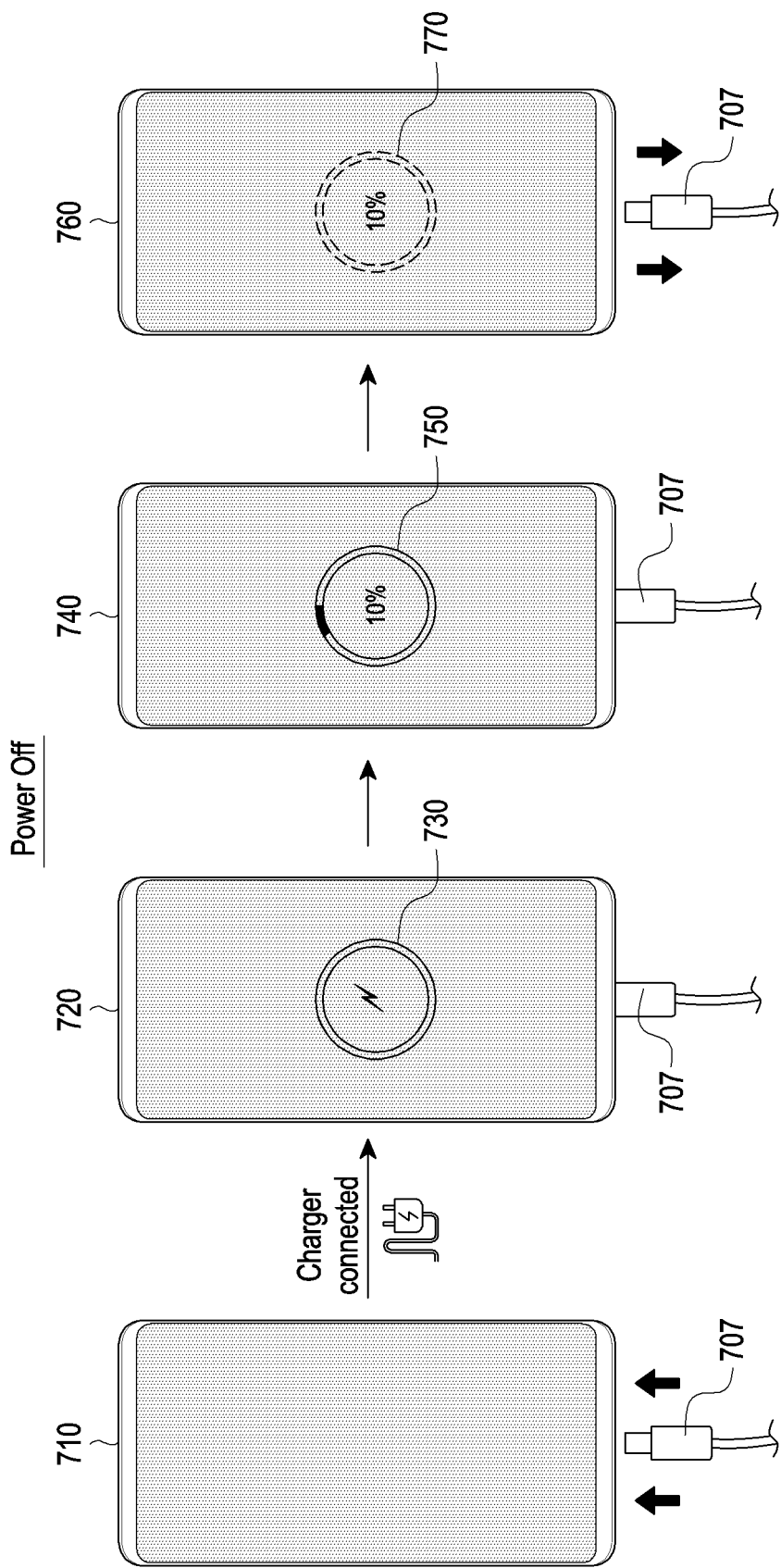
FIG. 7 is a diagram illustrating an example charging screen in start of charging in a power-off state, according to various embodiments of the disclosure.

FIG. 7 is a diagram illustrating an example charging screen in start of charging in a power-off state, according to various embodiments of the disclosure.

Referring to FIG. 7, in the power-off state, an electronic device 710 may display a graphic object 730 generated based on contents of a charging start event upon insertion of a connector 707 of the charger for wired charging or upon reception of a signal for wireless charging from the charger. In this case, the power-off state may be divided into a state where the power is off as the remaining battery capacity becomes 0% and the power is off as the user presses a power button long. As such, in the power-off state, power supply to all components including various hardware modules and/or software modules included in the electronic device is stopped. In the power-off state, minimum power supply is possible to perform a designated limited function, such that an electronic device 720 may display a first image 730 related to charging and then identify charging-related information according to connection of the charger. For example, an electronic device 740 may display a second image 750 indicating the remaining battery capacity continuously from the first image 730 to allow identification of the remaining battery capacity, and display continuous images to which a color effect such as gradation is applied to dynamically display a charging state. When the user removes the connector 707, an image 770 corresponding to stop of charging may be displayed differently from charging. As such, when the display is in the power-off state, the charging state may be indicated by continuous displaying of a plurality of images. In this case, the plurality of images may be given different attribute information including a shape of an image, a color effect such as gradation or flickering, etc., to add a moving effect corresponding to the charging scheme.

Figure 8:
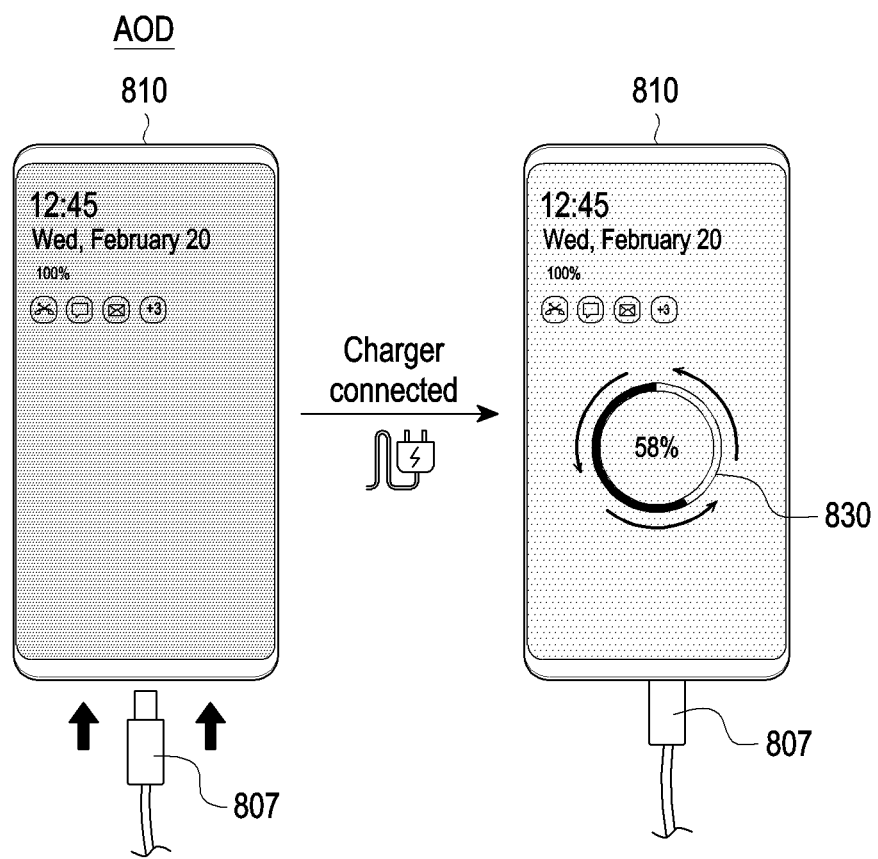
FIG. 8 is a diagram illustrating an example charging screen in start of charging in an always-on-display (AOD) state, according to various embodiments of the disclosure.

FIG. 8 is a diagram illustrating an example charging screen in start of charging in an AOD state, according to various embodiments of the disclosure.

FIG. 8 illustrates the AOD state where preset information, e.g., a time, a date, an application object, and a notification may be displayed in a designated color using a preset pixel and the other pixels may be set in a designated color (e.g., black). For example, when the display is an organic light-emitting diode (OLED) panel, the other pixels may be off.

Such an AOD function is a function that displays required information at all times using a low-power processor even in the sleep mode state, and an electronic device 810 may display information such as a calendar, weather, the remaining battery capacity, a missing call, and an unconfirmed message as well as a clock image on a part of the display as an AOD screen according to a user's selection.

According to various embodiments of the present disclosure, in the AOD state, an electronic device 810 may display a graphic object 830 generated based on contents of a charging start event upon insertion of a connector 807 of the charger for wired charging or upon reception of a signal for wireless charging from the charger. According to an embodiment of the present disclosure, the at least one graphic object may be output using various display schemes corresponding to a charging scheme, such as an animation effect, an icon, etc. For example, as shown in FIG. 8, an effect as if a circular graphic object 830 rotates may be output. In addition, a shadow surrounding the periphery of the graphic object 830 may be displayed differently, and an effect as if a part surrounding the peripheral region rotates may be output. To differentiate a sense of speed for charging, a color of the graphic object 830 may be output differently.

Whether the screen switches to the locked screen or home screen from the AOD screen may be determined according to user's setting, and when the locked screen is set to be displayed, the screen may switch to the home screen upon occurrence of a screen switch event (e.g., a touch input, a password input, a lock pattern input, etc.) in the locked screen.

Figure 9:
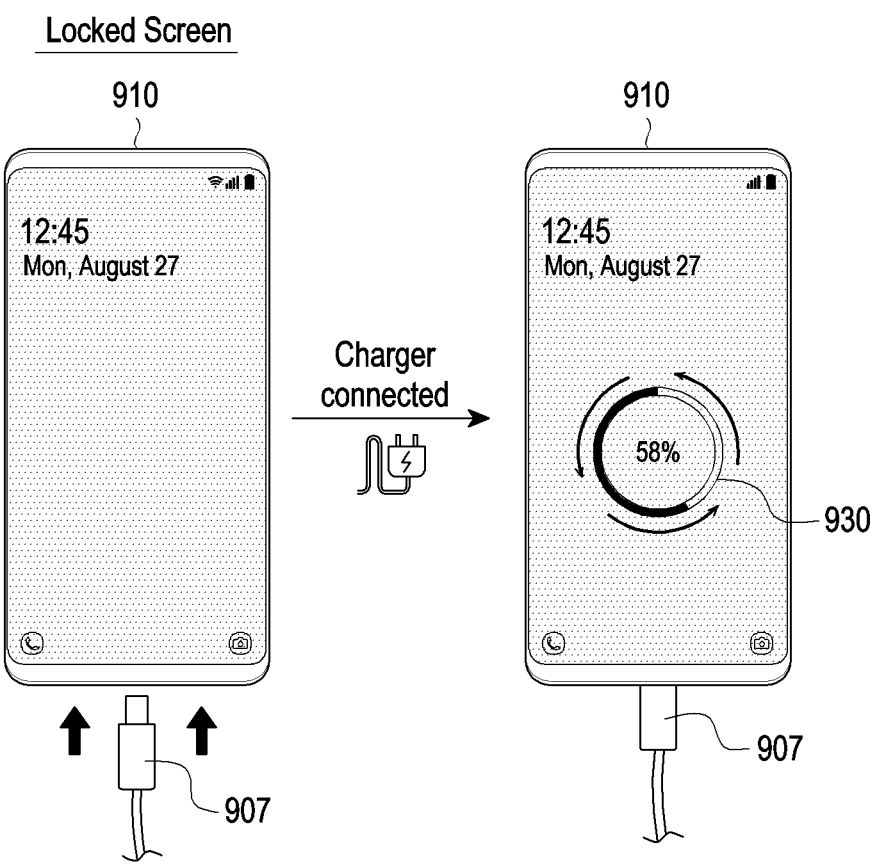
FIG. 9 is a diagram illustrating an example charging screen in start of charging in a screen-locked state, according to various embodiments of the disclosure.

FIG. 9 is a diagram illustrating an example charging screen in start of charging in a screen-locked state, according to various embodiments of the disclosure.

Referring to FIG. 9, in the locked screen, an electronic device 910 may display a graphic object 930 generated based on contents of a charging start event corresponding to start of charging, upon insertion of a connector 907 of the charger for wired charging or upon reception of a signal for wireless charging from the charger. The locked screen may correspond to the sleep mode, in which at least some of various hardware modules and/or software modules included in the electronic device may be deactivated or may be driven with minimum power to execute a designated function. For example, upon switch to the sleep mode, a picture or video taking function may be deactivated and the processor may be configured to drive only a limited function of an application program upon switch to the sleep mode. In this way, information processing or computation based on a hardware module and/or a software module is suppressed, thereby improving the battery use time. In the sleep mode, the graphic object 930 may be displayed for a certain time overlappingly on the locked screen currently displayed, and then disappear.

Figure 10:
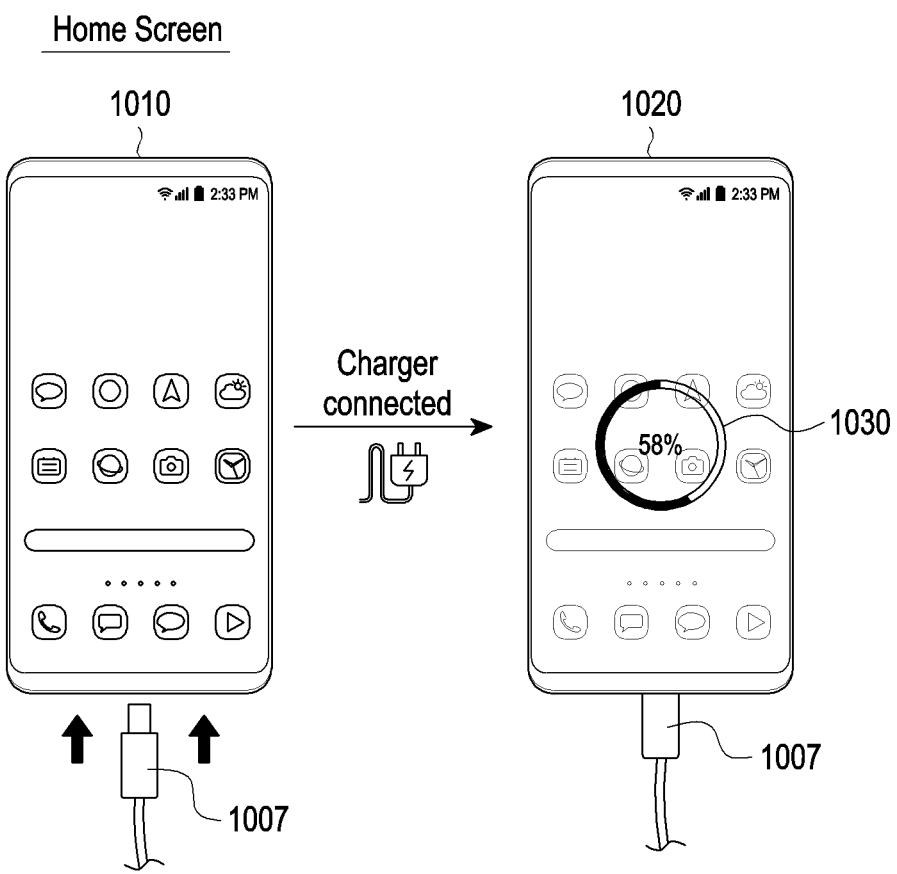
FIG. 10 is a diagram illustrating an example charging screen in start of charging in a home screen state, according to various embodiments of the disclosure.

FIG. 10 is a diagram illustrating an example charging screen in start of charging in a home screen state, according to various embodiments of the disclosure.

Referring to FIG. 10, as an electronic device 1010 receives a signal generated from outside, for example, a charging-related signal or an event is generated inside upon insertion of a connector 1007 for charging into the electronic device 1010, an electronic device 1020 may display a graphic object 1030 generated based on a user interface indicating start of charging or details of a charging start event. According to an embodiment of the present disclosure, the electronic device 1020 may display the graphic object 1030 overlappingly on the application execution screen. In this case, not to cover the application execution screen, the other part than the graphic object 1030 may be transparently displayed.

For example, the graphic object 1030 may overlap on the application execution screen using a layer. Herein, the layer may be defined as a frame for arranging the graphic object 1030. For example, when a plurality of graphic objects are arranged in association with charging, a plurality of layers may be used. When multiple layers exist, the layers may be displayed overlappingly with each other by adjusting a transparency differently for each layer, and graphic objects included in the respective layers may notify the charging state variously. For example, FIG. 10 shows the circular graphic object 1030, but various charging-related objects such as an image, a text, etc., may be arranged in different positions.

According to various embodiments of the present disclosure, the AOD screen, the locked screen, and the home screen may be generated by different applications. An application generating the AOD screen will be referred to as a first application, an application displaying the locked screen will be referred to as a second application, and an application displaying the home screen 430 will be referred to as a third application. According to an embodiment of the present disclosure, the first application may be executed by a first processor (e.g., a display driver integrated circuit (IC)) driven with low power, and the second application and the third application may be executed by a second processor (e.g., an application processor).

Figure 11:
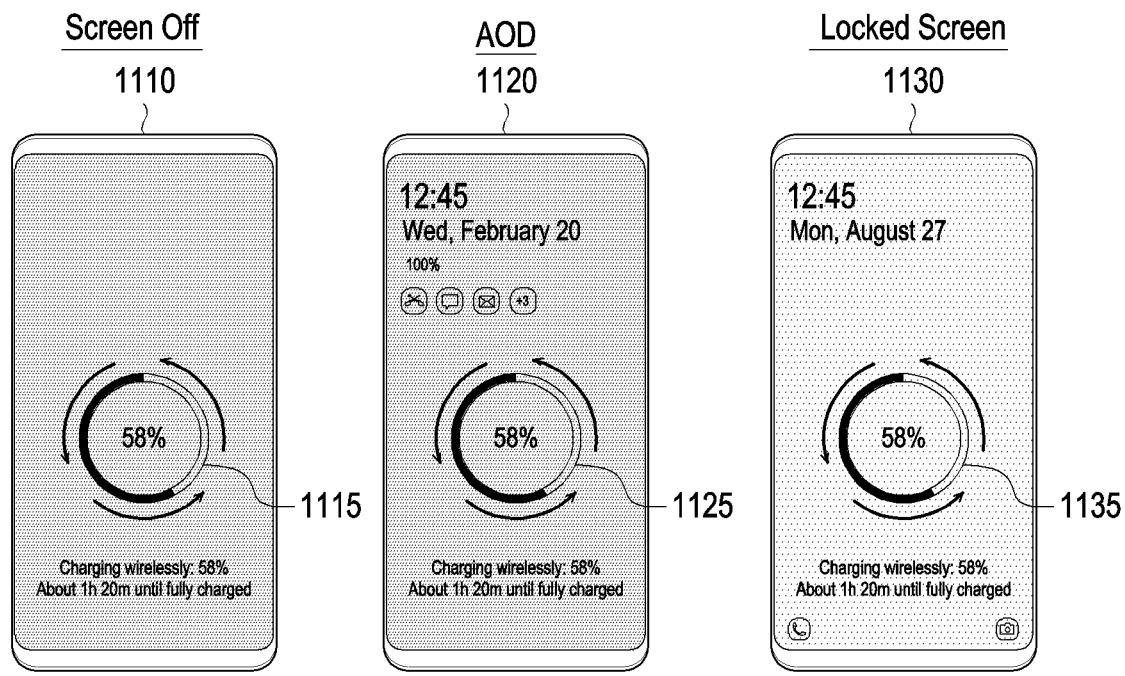
FIG. 11 is a diagram illustrating example charging screens corresponding to a first charging scheme based on a display state, according to various embodiments of the disclosure.
Figure 12:
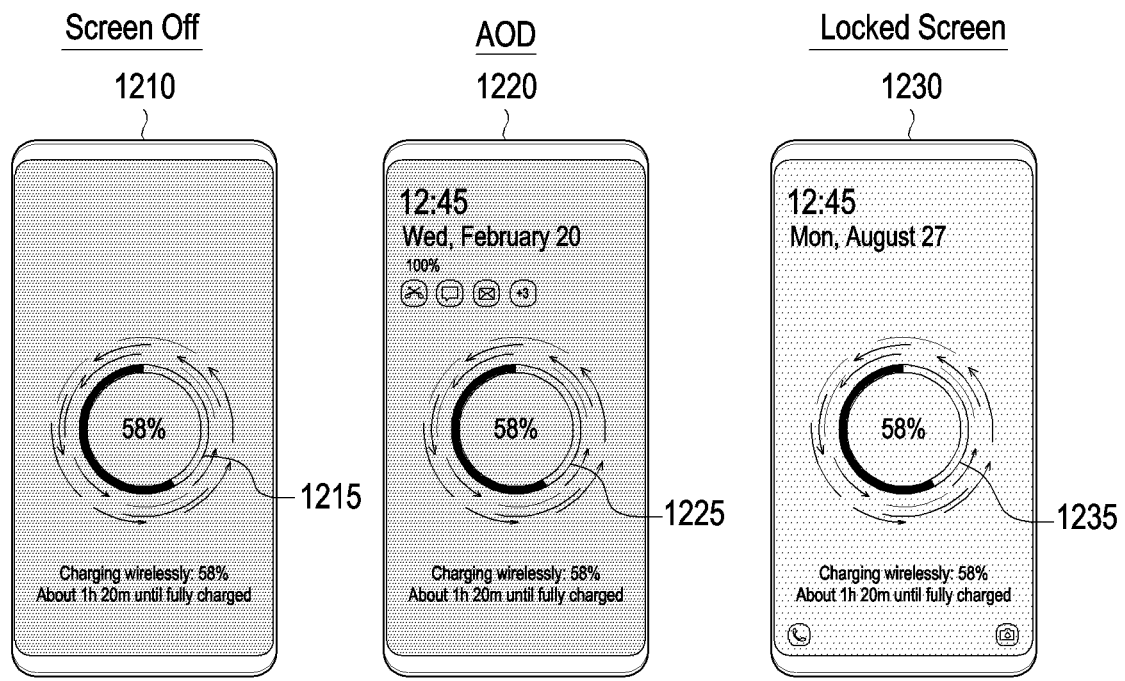
FIG. 12 is a diagram illustrating example charging screens corresponding to a second charging scheme based on a display state, according to various embodiments of the disclosure.

FIG. 11 includes diagrams illustrating examples of a charging screen corresponding to a first charging scheme based on a display state according to various embodiments of the present disclosure, and FIG. 12 includes diagrams illustrating examples of a charging screen corresponding to a second charging scheme based on a display state according to various embodiments of the present disclosure.

FIG. 11 shows graphic objects 1115, 1125, and 1135 based on the first charging scheme in a screen-off state 1110, an AOD state 1120, and a locked screen 1130, respectively, and FIG. 12 shows graphic objects 1215, 1225, and 1235 based on the second charging scheme in a screen-off state 1210, an AOD state 1220, and a locked screen 1230, respectively. The first charging scheme and the second charging scheme may correspond to different charging speeds.

Thus, the graphic objects 1115, 1125, and 1135 in FIG. 11 and the graphic objects 1215, 1225, and 1235 in FIG. 12 may be output using different display schemes. For example, by applying different colors, moving speeds, and color effects to the graphic objects 1115, 1125, and 1135 in FIG. 11 and the graphic objects 1215, 1225, and 1235 in FIG. 12, a sense of speed for charging may be implemented. For example, by adding a gradation effect to graphic objects or changing a tone, a brightness, and a chroma of a color of the graphic object, an effect of changing a speed may be expressed. For example, the sense of speed such as normal, fast, and super-fast may be expressed using a rotation speed of a region surrounding the graphic object, a color expressing high speed, etc. For example, the sense of speed may be expressed by expressing a color and a background color of the graphic object or a color surrounding the graphic object differently or flickering the graphic object.

Figure 13:
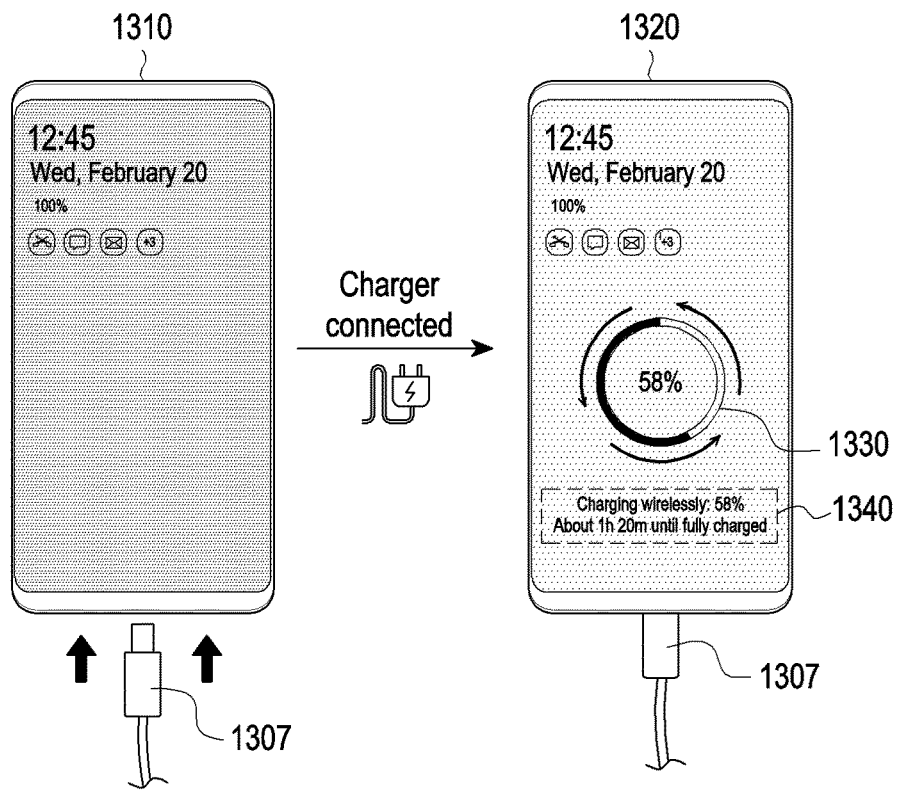
FIG. 13 is a diagram illustrating an example charging screen capable of providing a text, according to various embodiments of the disclosure.

FIG. 13 is a diagram illustrating an example charging screen capable of providing a text, according to various embodiments of the disclosure.

Referring to FIG. 13, in the AOD state, an electronic device 1310 may display a graphic object 1330 generated based on contents of a charging start event upon insertion of a connector 1307 for wired charging or upon reception of a signal for wireless charging. According to an embodiment of the present disclosure, after an electronic device 1320 activates at least a part of the display in the AOD state, the electronic device 1320 may output a graphic object 1330 and a text 1340 in activated regions, respectively. Herein, the text 1340 may include a battery charging state (e.g., a charging quantity %), a charging type (e.g., wired or wireless), and the remaining time until full charging as details for indicating a charging state.

Figure 14:
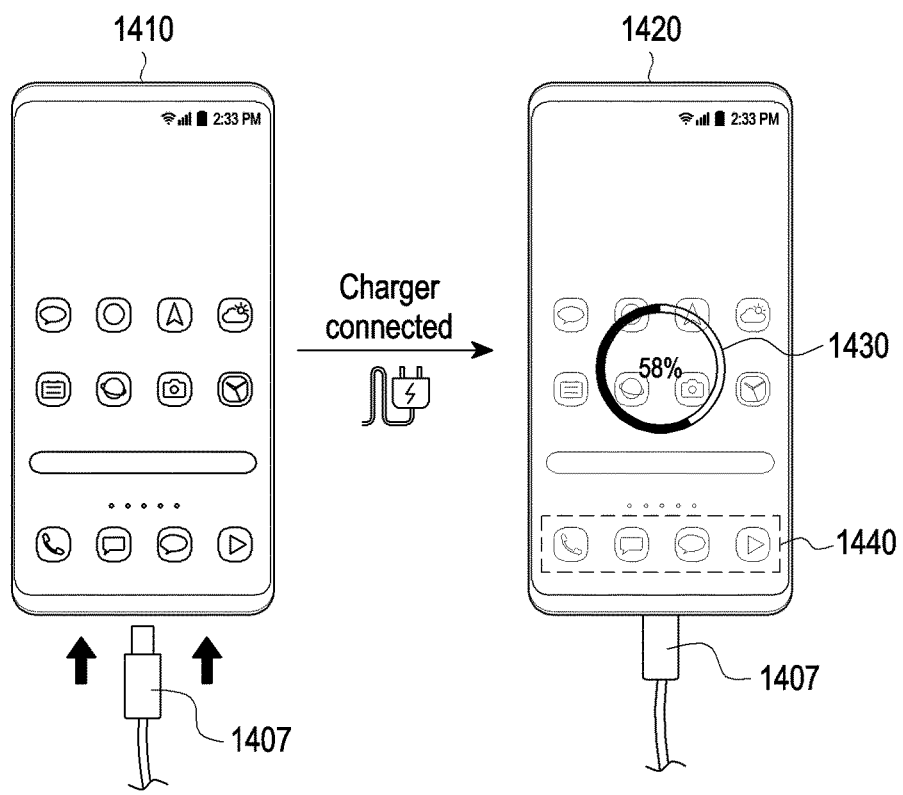
FIG. 14 is a diagram illustrating an example charging screen incapable of providing a text, according to various embodiments of the disclosure.

FIG. 14 is a diagram illustrating an example charging screen incapable of providing a text, according to various embodiments of the disclosure.

Referring to FIG. 14, in the home screen state or the application execution screen, an electronic device 1410 may display a graphic object 1430 generated based on contents of a charging start event upon insertion of a connector 1407 for wired charging or upon reception of a signal for wireless charging. In this case, various objects such as a text guiding a charging state, together with the graphic object 1430 may be arranged on the home screen or the application execution screen of the electronic device 1420, but in FIG. 14, application objects are arranged in a lower end of the display, such that a text region 1440 may be removed to avoid covering the application objects. That is, the text region 1440 may not be provided.

Figure 15:
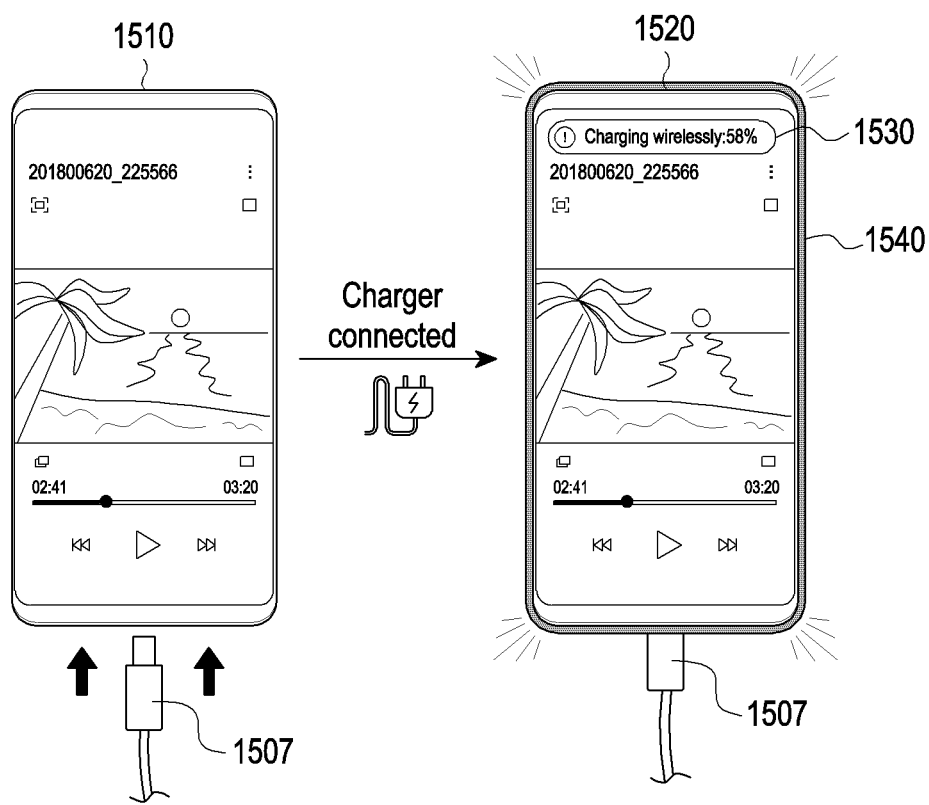
FIG. 15 is a diagram illustrating an example of notifying a charging state using an edge region of an electronic device, according to various embodiments of the disclosure.

FIG. 15 is a diagram illustrating an example of notifying a charging state using an edge region of an electronic device, according to various embodiments of the disclosure.

Referring to FIG. 15, according to an embodiment of the present disclosure, as an electronic device 1510 receives a signal generated from outside, for example, a charging-related signal or an event is generated inside upon insertion of a connector 1507 for charging into the electronic device 1510, an electronic device 1520 may display a graphic object generated based on a user interface indicating start of charging or details of a charging start event.

As shown in FIG. 15, the electronic device 1520 may display a graphic object related to charging on a region 1540 of the display.

According to various embodiments of the present disclosure, a position and a display scheme for displaying a graphic object may change with a charging scheme and a display state of an electronic device (e.g., a screen-off state, a power-off state, an AOD state, an application execution state, or a locked state). For example, in the application execution state, a graphic object may be displayed along the edge region 1540 of the display.

According to an embodiment of the present disclosure, when the partial region of the display is used, a charging state may be indicated using a user interface as well as a graphic object. For example, the user interface may be displayed along the edge region 1540 of the display. The edge region may correspond to a part of the display adjacent to a housing of the electronic device, and the electronic device may include four edge regions corresponding to a top end, a bottom end, a left side, and a right side of the display.

According to an embodiment of the present disclosure, the user interface may show an effect of moving along an edge region of the display in start of charging. For example, an animation effect of moving along an edge region starting from a first edge region ending in a fourth edge region may be implemented. According to an embodiment of the present disclosure, the user interface or the graphic object may include various attribute information. The attribute information may include, for example, at least one of a form (e.g., a face, a line), a color (e.g., a tone, a brightness, a chroma, or a color effect (e.g., a gradation effect, a flickering effect), movement (e.g., movement using pixel value control, movement based on continuous displaying of a plurality of images, movement of a graphic object), a moving direction, a moving speed, or a duration of display.

According to an embodiment of the present disclosure, the graphic object may be displayed on the display using a display scheme in which at least one of the size of the graphic object, the text, a color of an edge light of the electronic device, or flickering of the edge light of the edge changes.

According to an embodiment of the present disclosure, a text 1530 guiding a charging state, together with the graphic object, may be displayed together on the display. In this case, to avoid covering the application execution screen, the charging state may be displayed using an edge region, and at the same time, the text 1530 may be displayed overlappingly. For example, for the first charging scheme, flickering of the edge light may be faster than the second charging scheme. Moreover, using different edge light colors, charging schemes may be displayed to be distinguished.

An electronic device according to various embodiments may be one of various types of electronic devices, according to various embodiments of the present disclosure. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the present disclosure, the module may be implemented in a form of an application-specific integrated circuit (ASIC).

Various embodiments of the present disclosure as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments of the present disclosure, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments of the present disclosure, operations performed by the module, the program, or another component may be carried out sequentially, in parallel, repeatedly, or heuristically, or one or more of the operations may be executed in a different order or omitted, or one or more other operations may be added.

According to various example embodiments of the present disclosure, a non-transitory computer readable storage medium has stored thereon instructions which, when executed by at least one processor, cause an electronic device to perform at least one operation including: identifying whether a charging start event is detected, based the charging start event being detected, identifying whether a charging scheme of a battery for the electronic device is a first charging scheme or a second charging scheme and identifying a state of a display, in response to the charging scheme being the first charging scheme, displaying a graphic object on the display using a first display scheme indicating a first charging scheme based on the state of the display, and in response to the charging scheme being second first charging scheme, displaying the graphic object on the display using a second display scheme indicating a second charging scheme based on the state of the display.

According to various example embodiments of the present disclosure, based on various states of an electronic device such as a screen-off state or an application execution state, a notification regarding a charging state may be displayed overlappingly on a currently displayed screen.

According to various example embodiments of the present disclosure, in start of charging, an interactive visual effect may be provided in such a way not to disturb a user's work while sufficiently guaranteeing a notification regarding a charging state through a currently displayed screen.

According to various example embodiments of the present disclosure, in start of charging, a dynamic change of the graphic object may be output on the screen differently according to the charging scheme such as the normal charging scheme, the fast charging scheme, or the super-fast charging scheme.

According to various example embodiments of the present disclosure, the notification regarding the charging state may be provided even with lower power in a low-power state such as the screen-off state, the power-off state, and the AOD state.

While the disclosure has been illustrated and described with reference to various example embodiments, it will be understood that the various example embodiments are intended to be illustrative, not limiting. It will also be understood by one of ordinary skill in the art that various changes in form or detail may be made without departing from the true spirit and full scope of the disclosure, including the appended claims and their equivalents.

What is claimed is:

1. An electronic device comprising:
a touchscreen display; and
at least one processor, wherein the at least one processor is configured to:
  display, on the touchscreen display, a first screen in a first brightness,
  identify a connection of a connector for charging a battery to the electronic device while the first screen is displayed in the first brightness,
  based on the identification and the first screen being a home screen, display, on the touchscreen display, the home screen in a second brightness and first visual information on a charging status with respect to the battery in a third brightness greater than the second brightness, wherein the home screen in the second brightness and the first visual information in the third brightness are displayed together on the touchscreen display, and
  based on the identification and the first screen being a locked screen, display, on the touchscreen display, second visual information on the charging status with respect to the battery and additional information, including information on the charging status displayed via a text, with respect to the battery, wherein the locked screen, the second visual information and the additional information are displayed together on the touchscreen display.

2. The electronic device of claim 1, wherein the first brightness is greater than the second brightness.

3. The electronic device of claim 1, wherein the at least one processor is configured so that the additional information is not displayed on the home screen in the second brightness when the first screen is the home screen.

4. The electronic device of claim 1, wherein the charging status includes a charging quantity with respect to the battery.

5. The electronic device of claim 1, wherein the at least one processor is configured so that the home screen in the second brightness is displayed in a first layer, and wherein the first visual information is a second layer overlapping the first layer.

6. The electronic device of claim 1, wherein the at least one processor is configured so that the locked screen, overlapped with the second visual information and the additional information, is displayed in a fourth brightness greater than a brightness of a off state.

7. An electronic device comprising:
a touchscreen display, and at least one processor, wherein the at least one processor is configured to:
display, in a first layer, a first screen in a first brightness,
identify a connection of a connector for charging a battery to the electronic device while the first screen is displayed in the first brightness,
based on the identification and the first screen being a home screen, display, in the first layer, the home screen in a second brightness, and display, in a second layer overlapping the first layer, first visual information on a charging status with respect to the battery in a third brightness greater than the second brightness, and
based on the identification and the first screen being a locked screen, display, in the second layer, second visual information on the charging status with respect to the battery and additional information, including information on the charging status displayed via a text, with respect to the battery, wherein the locked screen, the second visual information and the additional information are displayed together on the touchscreen display.

8. The electronic device of claim 7, wherein the first brightness is greater than the second brightness.

9. The electronic device of claim 7, wherein the at least one processor is configured so that the additional information is not displayed on the home screen in the second brightness when the first screen is the home screen.

10. The electronic device of claim 7, wherein the at least one processor is configured so that the locked screen, overlapped with the second visual information and the additional information, is displayed in a fourth brightness greater than a brightness of an off state.

\* \* \* \* \*